(12) United States Patent
Freund et al.

(10) Patent No.: US 8,996,312 B1
(45) Date of Patent: Mar. 31, 2015

(54) SYSTEMS, METHODS, AND COMPUTER-READABLE MEDIA FOR PROVIDING ALTERNATIVE TRIPS FOR A COMPUTER-IMPLEMENTED TRIP SEARCH

(75) Inventors: Martin Freund, Mountain View, CA (US); Momchil Filev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 13/534,916

(22) Filed: Jun. 27, 2012

(51) Int. Cl.
*G01C 21/34* (2006.01)

(52) U.S. Cl.
CPC ............................ *G01C 21/3461* (2013.01)
USPC ........................... 701/533; 701/117; 455/457

(58) Field of Classification Search
USPC ................... 701/533, 117; 455/457
See application file for complete search history.

(56) References Cited

U.S. PATENT DOCUMENTS

| | | | |
|---|---|---|---|
| 6,317,686 B1 * | 11/2001 | Ran ................................ 701/533 |
| 7,702,456 B2 * | 4/2010 | Singh ............................. 701/425 |
| 8,311,859 B2 * | 11/2012 | Patoureaux et al. ............... 705/5 |
| 8,468,464 B2 * | 6/2013 | Abramson et al. ............ 715/804 |
| 8,538,693 B2 * | 9/2013 | McBride et al. .............. 701/532 |
| 8,577,609 B2 * | 11/2013 | Fujimoto ....................... 701/533 |
| 2005/0288973 A1 * | 12/2005 | Taylor et al. ....................... 705/5 |
| 2006/0059023 A1 * | 3/2006 | Mashinsky ......................... 705/5 |
| 2006/0184314 A1 * | 8/2006 | Couckuyt et al. .............. 701/202 |
| 2007/0198310 A1 * | 8/2007 | Crean et al. ........................ 705/5 |
| 2007/0239348 A1 * | 10/2007 | Cheung .......................... 701/200 |
| 2008/0015926 A1 * | 1/2008 | Marcken .......................... 705/10 |
| 2009/0030746 A1 * | 1/2009 | Etzioni et al. ...................... 705/5 |
| 2010/0228574 A1 * | 9/2010 | Mundinger et al. ............... 705/4 |
| 2011/0106423 A1 * | 5/2011 | Morley .......................... 701/201 |
| 2011/0251917 A1 * | 10/2011 | Etzioni et al. ............... 705/26.4 |
| 2012/0004841 A1 * | 1/2012 | Schunder ...................... 701/201 |
| 2013/0066548 A1 * | 3/2013 | Gruen et al. .................. 701/410 |
| 2013/0103313 A1 * | 4/2013 | Moore et al. .................. 701/533 |
| 2013/0204527 A1 * | 8/2013 | Schilling et al. .............. 701/533 |
| 2013/0317745 A1 * | 11/2013 | Sano et al. .................... 701/533 |
| 2013/0345979 A1 * | 12/2013 | Oostveen ...................... 701/533 |
| 2014/0046594 A1 * | 2/2014 | Watanabe et al. ............. 701/533 |

FOREIGN PATENT DOCUMENTS

EP 2189757 A2 * 5/2010

OTHER PUBLICATIONS

Jianghao Luo, "Service Systems and Service Management, 2007 International Conference on ", Publication Year: 2007, pp. 1-7.*

* cited by examiner

*Primary Examiner* — Tuan C. To
(74) *Attorney, Agent, or Firm* — Dority & Manning, P.A.

(57) ABSTRACT

Provided are systems, computer-implemented methods, and computer-readable media for providing alternative trips for a computer-implemented trip search. User may submit a trip request associated with a primary transportation mode between an origin and a destination, such as by submitting a request for directions via an interactive map. The trip price for the primary trip may be determined. Additionally, alternative trip prices for alternative transportation modes may be determined and compared to the primary trip price. If an alternative trip price is lower than the primary trip price, an alternative trip notification may be provided to user with information about the alternative trip, such as a link to further details about the alternative trip.

20 Claims, 5 Drawing Sheets

SYSTEMS, METHODS, AND COMPUTER-READABLE MEDIA FOR PROVIDING ALTERNATIVE TRIPS FOR A COMPUTER-IMPLEMENTED TRIP SEARCH

BACKGROUND OF THE INVENTION

1. Field of the Invention

This invention relates generally to computer-implemented searches of map data, and more particularly, to searches for trips between an origin and destination.

2. Description of the Related Art

The Internet provides many different types of information and is useful for a variety of purposes. For example, users may use the Internet to retrieve information about businesses or other entities, view interactive maps, search for geographic areas, etc. Users searching for geographic areas may user interactive maps and web search engines to enter a query, such as an address, and receive results, such as an indicator on an interactive map. Users planning a trip, such as a vacation or business trip, may also search for a trip from one geographic area to another geographic area and may view the trip on an interactive map. However, when planning a trip, a user may spend a lot of time researching different transportation options for a trip and determining the most cost-effective trip between geographic areas. Additionally, a user planning a trip may be unaware of all potential transportation options and their associated costs.

SUMMARY OF THE INVENTION

Various embodiments of systems, methods, and computer-readable media for providing alternative trips for a computer-implemented trip search are provided herein. In some embodiments, a method is provided that includes receiving, by one or more processors, a trip request from a client computer, the trip request including a request for directions from an origin to a destination via a primary transportation mode and determining, by one or more processors, a primary trip price associated with the trip request. The method further includes determining, by one or more processors, an alternative transportation mode between the origin and the destination, the alternative transportation mode different than the primary transportation mode and determining for the alternative transportation mode, by one or more processors, an alternative trip price. Further, the method includes providing over a network, by one or more processors, directions between the origin and the destination and providing over a network, by one or more processors, an alternative trip notification having information associated with the alternative transportation mode if the alternative trip price is less than the primary trip price.

In another embodiment, a non-transitory tangible computer-readable storage medium having executable computer code stored thereon for providing alternative trips for a computer-implemented trip search is provided. The code includes a set of instructions that causes one or more processors to perform receiving, by one or more processors, a trip request from a client computer, the trip request including a request for directions from an origin to a destination via a primary transportation mode and determining, by one or more processors, a primary trip price associated with the trip request. The code further includes a set of instructions that causes one or more processors to perform determining, by one or more processors, an alternative transportation mode between the origin and the destination, the alternative transportation mode different than the primary transportation mode and determining for the alternative transportation mode, by one or more processors, an alternative trip price. Further, code includes a set of instructions that causes one or more processors to perform providing over a network, by one or more processors, directions between the origin and the destination and providing over a network, by one or more processors, an alternative trip notification having information associated with the alternative transportation mode if the alternative trip price is less than the primary trip price.

Finally a system for providing alternative trips for a computer-implemented search is provided. The system includes one or more processors and a tangible non-transitory memory accessible by the one or more processors, the memory having computer code stored thereon. The computer code includes a set of instructions that causes one or more processors to perform receiving, by one or more processors, a trip request from a client computer, the trip request including a request for directions from an origin to a destination via a primary transportation mode and determining, by one or more processors, a primary trip price associated with the trip request. The code further includes a set of instructions that causes one or more processors to perform determining, by one or more processors, an alternative transportation mode between the origin and the destination, the alternative transportation mode different than the primary transportation mode and determining for the alternative transportation mode, by one or more processors, an alternative trip price. Further, code includes a set of instructions that causes one or more processors to perform providing over a network, by one or more processors, directions between the origin and the destination and providing over a network, by one or more processors, an alternative trip notification having information associated with the alternative transportation mode if the alternative trip price is less than the primary trip price.

Figure 1:
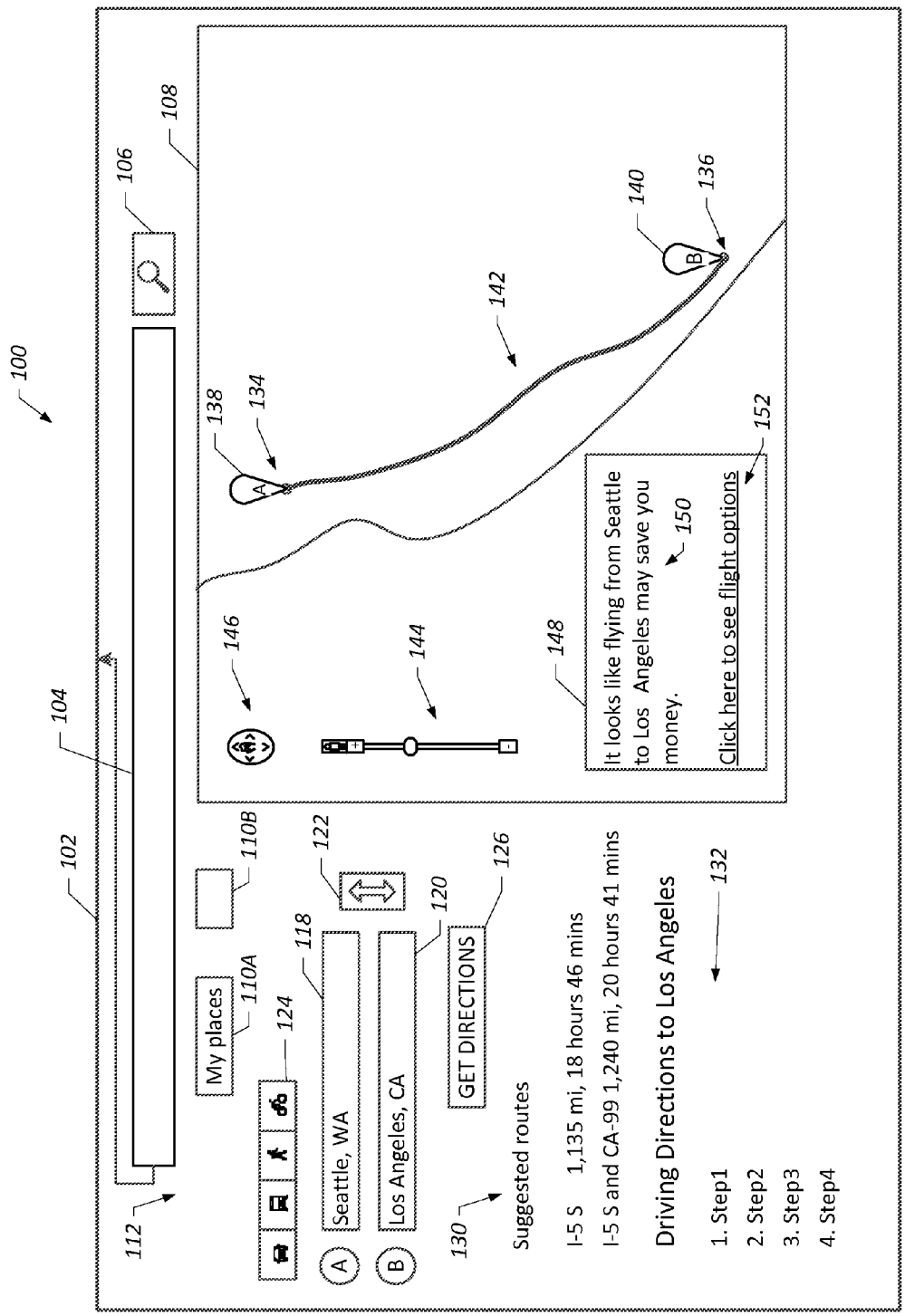
FIG. 1 is a diagram of a screenshot that illustrates an application having an alternative trip comparison in accordance with an embodiment of the present embodiment.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, computer-implemented methods, and computer-readable media for providing alternative trips for a computer-implemented trip search. A user may enter a request for a primary trip associated with a primary transportation mode, such as in an application having an interactive map. For example, the trip request may include a request for directions between an origin and a destination. A trip price for the user-requested primary trip is determined. Additionally, one or more alternative trips associated with alternative transportation modes are determined. The trip price for the alternative trips is determined and compared to the primary trip price, and the alternative trips having a lower price than the primary trip are added to a list.

If there are no alternative trips in the alternative trip list, directions and other data responsive to the user trip request are provided. If there are alternative trips in the alternative trip list, one or more alternative trips are selected. For example, the alternative trips may be ranking based on price and the lowest priced alternative trip selected. Alternatively, multiple alternative trips may be selected. An alternative trip notification is provided to the user and includes information about the selected alternative trips, such as a descriptive text and a link to further details about the alternative trip. A user may select the link to receive detailed information about the selected alternative trips.

FIG. 1 depicts a screenshot 100 from an application 102 illustrating a transportation mode comparison in accordance with an embodiment of the present invention. The application 102 may include, for example, a web browser or a standalone application, such as a standalone maps application. Thus, the screenshot 100 may be illustrative of a screenshot from a web browser or a standalone maps application, such as a native application for a portable electronic device such as smartphone, tablet computer, and the like. As shown in FIG. 1, the application 102 may include a search field 104, a search button 106, an interactive map 108, controls 110, and a trip area 112. As described below, a user may enter an origin and destination for a trip and receive a visual depiction of the trip in the interactive map 108 and text directions in the trip area 112. In other embodiments, a user may request a trip using other applications or other content provided in the application 102, such as a flight search website, a public transportation website, and the like.

The controls 110 may include buttons, toggles, sliders, or other controls for interacting with the application 102. For example, a "My Places" button 110A may enable a user to retrieve a list of saved places from a local computer or a remote server. Other controls 110B may be provided, such as a print button for printing directions, a link button for generating a permanent, copy-able link to the directions, and so on.

The trip area 112 may include various fields and informational text regarding user requested trips and directions provided for such trips. For example, the trip area 112 may include an origin field 118, a destination field 120, an origin/destination switch 122, a transportation mode control 124, and a "Get directions" button 126. The origin field 118 and the destination field 120 may receive an origin (e.g., Seattle, Wash.) and a destination (e.g., Los Angeles, Calif.) respectively for a user requested trip. A user may type an origin, destination, or both directly into the fields 118 and 120, or a user may click an icon on the interactive map 108 to select an origin or a destination. A user may switch the entered origin and destination by selecting (e.g., touching, clicking etc.) the origin/destination switch 122.

The transportation mode control 124 includes buttons or other controls for selecting the desired transportation mode for a trip. For example, as shown in FIG. 1, the transportation mode control 124 includes buttons for driving, public transportation, walking, and bicycling. As described below, when entering an origin and a destination, a user may select a transportation mode for directions by selecting the desired mode from the transportation mode control 124. The "Get Directions" button 126 sends a request for directions in response to a user selection (e.g., click) of the button.

As described above, to enter a trip, a user may enter an origin (e.g., zip code, a city, state, point-of-interest, district, province, country, or other origin) in the origin field 118 and may enter a destination (e.g., zip code, a city, state, point-of-interest, district, province, country, or other destination) in the destination field 120. By selecting the Get Directions button 126, the user may submit a trip request and receive directions. The trip and directions may be depicted on the interactive map 108. Routes 130 for a submitted trip are displayed (e.g., "Suggested routes). For example, one, two, three, or more routes 130 may be displayed, and a user may select a route to receive directions and display the directions on the interactive map 108. Additionally, text directions 132 (e.g., step-by-step directions) are displayed. The text directions 132 may include, for example, one or more direction steps to complete a user requested trip between the origin and destination entered into the fields 118 and 120.

As mentioned above, the interactive map 108 may display a user-requested trip between and an origin 134 (based on the origin entered into the origin field 118) and a destination 136 (based on the origin entered into the destination field 120). The interactive map 108 depicts an origin marker 138 at the origin 134 and a destination marker 140 at the destination 136. The interactive map 108 also depicts a highlighted route 142 (based on a selected route from the routes 130) that corresponds to the text directions 132. The interactive map also includes a slider 144 that enables a user to zoom in and out of the interactive map 108 and a button 146 that enables a user to pan the interactive map 108. Additionally, the interactive map 108 may include other controls and may receive other user inputs to enable a user to interact with the interactive map 108. For example, the interactive map 108 may receive a drag gesture to enable a user to pan the interactive map 108. Additionally, the markers 138 and 140 are selectable and a user may enter requests based on an origin or destination by selecting the appropriate marker 138 and 140.

As described further below, upon entering a trip between an origin and destination, an alternative trip notification 148 is displayed if an alternative trip is available. The providing of the alternative trip notification is based on a price comparison between the user requested trip and transportation mode and one or more alternative trips corresponding to alternative transportation modes. For example, if a user defines a trip based on a driving transportation mode, an alternative trip notification 148 may be displayed if an alternative trip associated with a flying transportation mode costs less than the user requested trip. The alternative trip notification 148 includes information about the alternative trip, such as descriptive text 150 describing the trip and a link 152 to further details about the alternative trip. For example, is a user selects the link 152, cost, purchase details, and other details may be display in the application 102. In some embodiments, multiple alternative trip notifications may be displayed, such as a trip notification for each of the top two alternative trips of a ranked list based on a cost ranking. The alternative trip notification 148 may include visual notification, audible notification, or a combination thereof, and may be displayed within the application 102 or sent directly to a user's email address, social networking profile, or other communication technologies.

In some embodiments, the application 102 may provide for user entry of information associated with various transportation modes. For example, for a driving transportation mode, the application 102 may receive user entries for year, make, and model of a vehicle. As described below, the year, make, and model of the vehicle may be used to determine the gas mileage for the vehicle for use in the calculation of a trip price that includes fuel consumption. For other transportation modes, the application 102 may receive other user entries that may be used to determine the cost of a trip.

Figure 2:
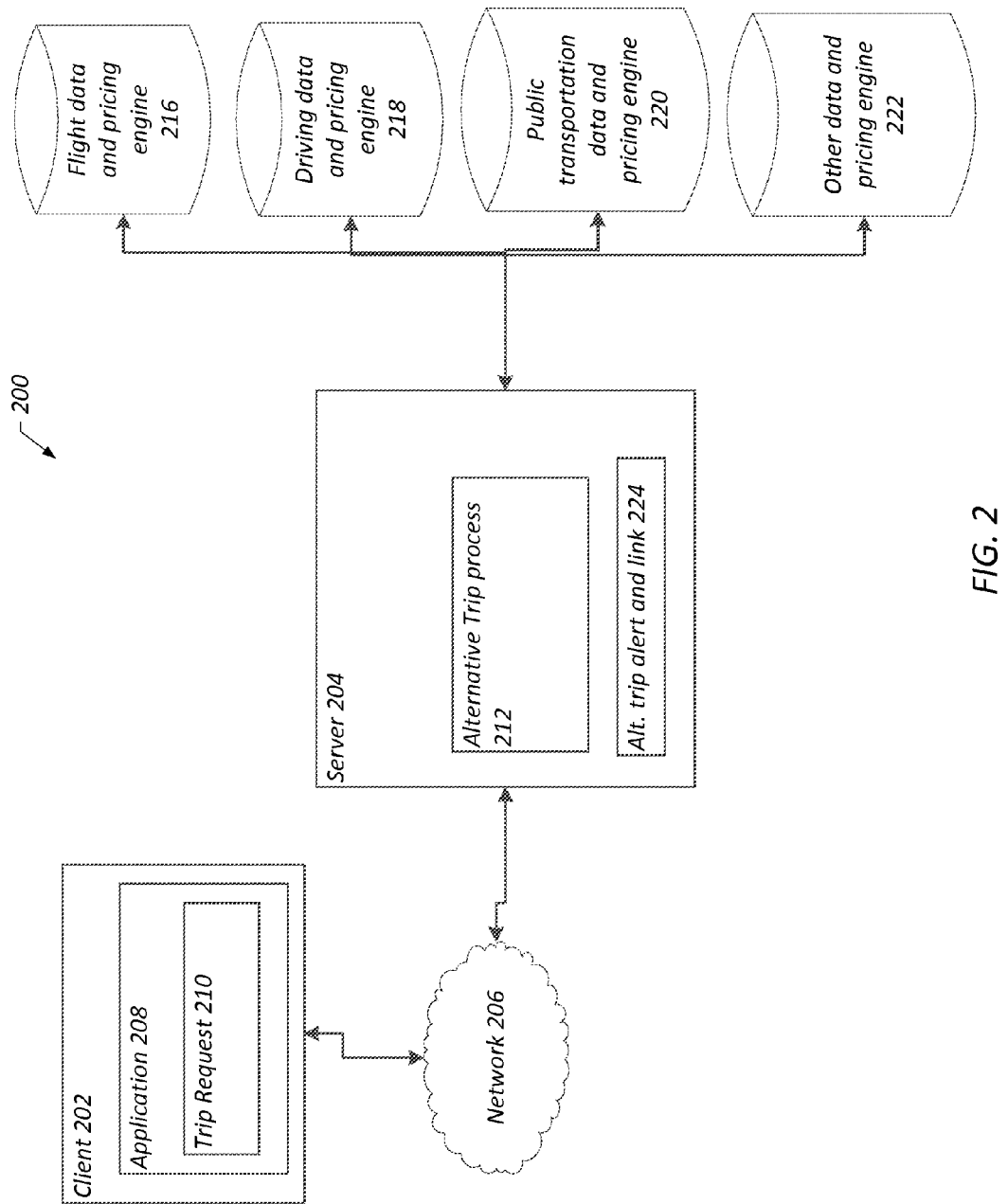
FIG. 2 is a diagram of a system in accordance with an embodiment of the present invention.

FIG. 2 depicts a system 200 in accordance with an embodiment of the present invention. As shown in FIG. 2, the system 200 may include a client computer 202 for use by a user and a server 204 (e.g., one or more servers) that communicate via a network 206. The server 204 provides services, webpages, and other data to the client computer 202. The client computer 202 may include laptop computers, tablet computers, smartphones, personal digital assistants, etc., and may include a receiver for a satellite-based positioning system, such as a Global Positioning System (GPS) receiver. In some embodiments, the client computer 202 may include a desktop computer. A user may use the client computer 202 to retrieve information, view interactive maps, perform searches, such as by searching the World Wide Web using a web-based search engine or by searching an interactive map of a geographic area, and request trips.

The server 204 may be a single server (in a discrete hardware component or as a virtual server) or multiple servers. The server 204 may include web servers, application servers, or other types of servers. Additionally, the server 204 may be, for example, computers arranged in any physical and virtual configuration, such as computers in one or more data processing centers, a distributed computing environment, or other configuration. Such configurations may use the network 206 for communication or may communicate over other networks.

The client computer 202 and server 204 are in communication with the network 206, such as through a wired or wireless network interface. In some embodiments, the network 108 may include multiple networks, and may include any suitable network and networking technology, such as the Internet, an intranet, a local area network (LAN), a wide area network (WAN), or any other suitable network. Additionally, the network 206 may include a wired network, a wireless network, or both. Moreover, it should be appreciated that the client computer 202 and server 204 may communicate over different networks separately and simultaneously. For example, the client computer 202 may communicate over both a wireless Ethernet network and a cellular network.

A user may user the client computer 202 to request a trip (e.g., by requesting directions) associated with a transportation mode. As shown in FIG. 2 and as described above, the client 202 may execute an application 208, such as a web browser or a standalone interactive map application. As also described above, a user may define a trip request 210 in the application 208, such as by specifying an origin and destination for a user-requested trip. Additionally, the trip request 210 may include an associated transportation mode for the trip, such as driving, public transportation, flying, etc. As mentioned, in some embodiments the trip request 219 may include other user-associated data for the requested trip, such as vehicle data, that is used to determine a trip price. The trip request 210 is transmitted to the server 204 over the network 206.

The server 204 may receive and process the trip request 210, such as by providing text directions and a depiction of the trip on an interactive map. The server 204 may include an alternative trip process 212. The alternative trip process 212 estimates the price of a primary (e.g., user-requested) trip associated with a primary transportation mode and alternative trips associated with alternative transportation modes. The alternative trip process 212 also compares the price of primary (e.g., user-requested) trip to alternative trip prices associated with alternative transportation modes and selects an alternative trip based on the comparison. The alternative trip process 212 may use and obtain data from various engines included on or accessible by the server 204. For example, these engines may be a part of the server 204 or may be executed on other servers accessible by the server 204, such as over a network.

In some embodiments, for example, the engines may include a flight data and pricing engine 216, a driving data and pricing engine 218, a public transportation data and pricing engine 220, and other data and pricing engine 222. Each engine may include data associated with a transportation mode, such as pricing data, and may include the capability to calculate the price of a trip using the associated transportation mode. For example, the flight data and pricing engine 216 may include airline information, flight number, flight times, ticket prices, and so on to perform the calculation of a price for a trip via flying. The driving data and pricing engine may include Environmental Protection Agency (EPA) fuel rating for vehicles, fuel prices, cost-per-mile usage costs for vehicles, and so on to perform the pricing of a trip via driving. The public transportation data and pricing engine 220 may include public transportation provider information, ticket prices, routing information, and so on to perform the pricing of trips via public transportation. As used herein, public transportation may include trains, buses, trolleybuses, trams, subways, ferries, and other public transportation services. The other data and pricing engine 222 may include data for performing the pricing of trips using other transportation modes, such as private ships, private trains, private buses, taxicabs, and other transportation modes. Additionally, each data and pricing engine 216, 218, 220, and 222 may include or have access to other trip pricing information, such as median hotel prices in a geographic area.

By using the prices obtained from the engines 216, 218, 220, and 222, the alternative trip process 212 may calculate the price of a primary trip and alternative trips. The alternative trip process 212 then compares the prices of the primary trip and the alternative trips and may select one or more alternative trips having a lower price than the primary trip. For example, when the primary trip is associated with a driving transportation mode (i.e., using a user's vehicle), the trip price may include the cost of fuel consumption based on the gas mileage obtained by the user's vehicle, as determined from user-entered vehicle specifications such as year, make, and model. Additionally, some trip prices may include the median cost of lodging (e.g., hotel or motel costs) for a geographic area if a trip includes an overnight stay. A trip may be considered to include an overnight stay if the transportation mode is driving and the estimated travel time for the trip is more than a predetermined number of hours (e.g., 10 hrs). As described above such data may be included in or accessible by the engines 216, 218, 220, and 222.

As described below, if an alternative trip is selected, an alternative trip notification and alternative trip information 224 may be provided to client 202, such as by transmitting the notification and information 224 over the network 206 for display in the application 208. For example, as described in FIG. 1, in some embodiments the notification and information 224 may be displayed in an interactive map within the application 204. In some embodiments, the information may include descriptive text for the alternative trip and a link to access details about the alternative trip.

Figure 3:
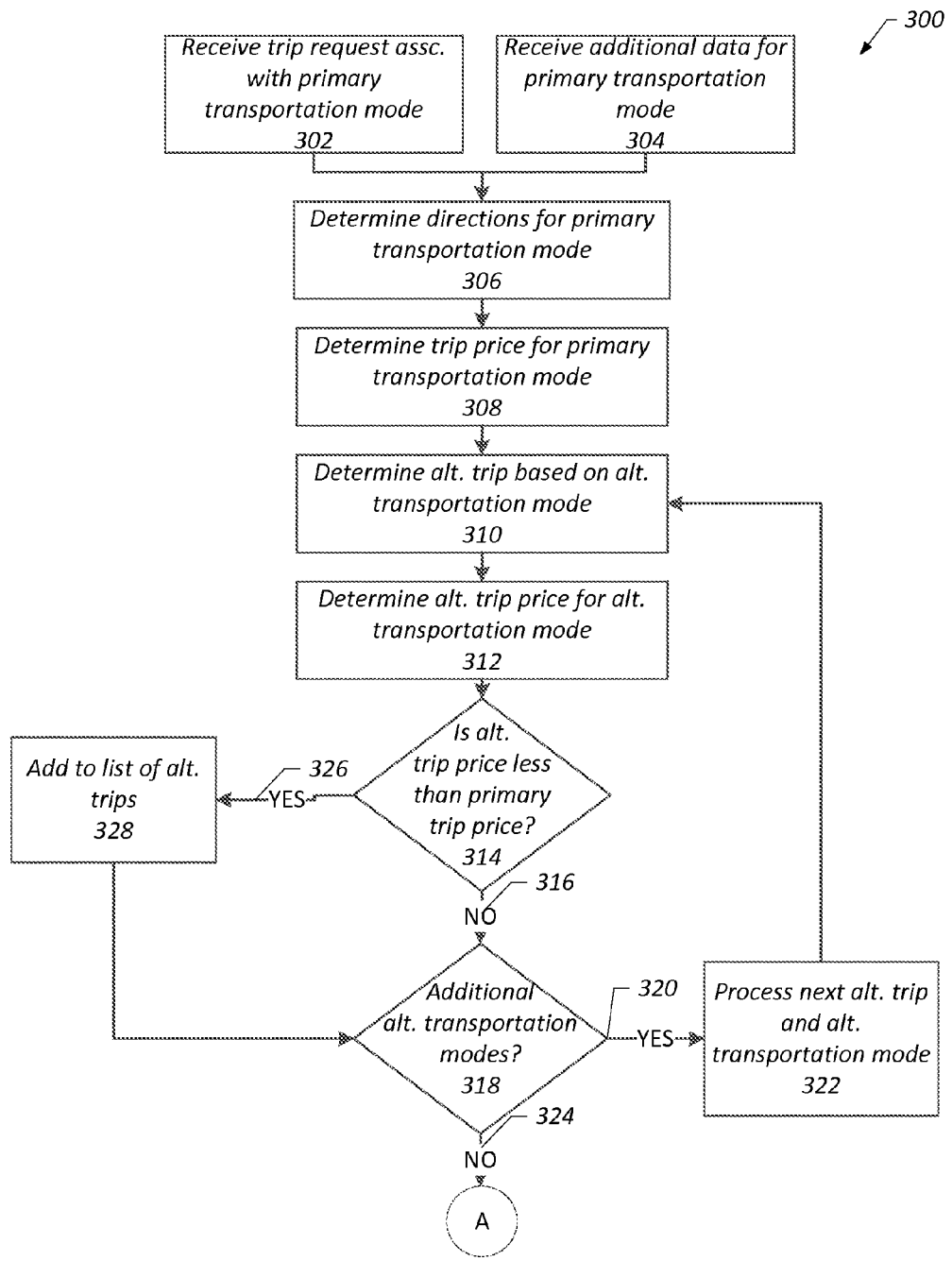
FIG. 3 is a block diagram of a first portion of a process for providing an alternative trip in accordance with an embodiment of the present invention in accordance with an embodiment of the present invention.

FIG. 3 depicts a first portion 300 of a process for providing an alternative trip in accordance with an embodiment of the present invention. For example, the process portion 300 may be implemented by the alternative trip process 212 described above in FIG. 2. Some or all steps of the process 300 may be implemented as executable computer code stored on a non-transitory tangible computer-readable storage medium and executed by one or more processors of a special-purpose machine, e.g., a computer programmed to execute the code. Initially, the process 300 may receive a primary trip request for a trip between an origin and a destination and associated with a primary transportation mode. The trip request may include, for example, a request for directions between an origin and a destination in an interactive maps application. As noted above, the origin and destination may include, for example, a zip code, city, state, point-of-interest, district, province, country, or other specified location. In some embodiments, additional data associated with the primary transportation mode may be received (block 304), such as year, make, and model of a user's vehicle. Next, the primary trip for the primary transportation mode may be determined (block 306), such as by determining routes, directions, and other trip information that may be provided to a user. Additionally, the trip price for the primary transportation mode is determined (block 308), such as by using a data and pricing engine associated with the primary transportation mode. As described above, the determination of a trip price may include costs of transportation, such as driving costs, lodging costs, and other suitable costs of a trip.

An alternative trip is then determined based on an alternative transportation mode (block 310). The alternative transportation modes include those transportation modes different than the primary transportation mode and for which a trip between the origin and destination is obtainable. The alternative trip price for the alternative transportation mode is also determined (block 312), such as from a data and pricing engine associated with the alternative transportation mode. Next, the alternative trip price may be compared to the primary trip price (decision block 314). If the alternative trip price is greater than the primary trip price (line 316), the process 300 may continue by determining if there are more alternative transportation modes for the primary trip (decision block 318). If there are more alternative transportation modes (line 320), the next alternative trip and alternative transportation mode may be processed (block 322). If there no more alternative transportation modes for processing (line 324), the process 300 may continue to the process described below and depicted in FIG. 4, as shown by connector block A. If the current alternative trip price is less than the primary trip price (line 326), the alternative trip may be added to a list of alternative trips (block 328) and the process may then continue to decision block 318 to determine if there are additional alternative transportation modes to be processed.

In some embodiments, an alternative trip may be associated with multiple alternative transportation modes. For example, an alternative trip may include flying and public transportation, flying and driving, public transportation, and so on. In such embodiments, the trip price for such alternative trips may be based on the combined costs for each alternative transportation mode. Thus, alternative trips associated with multiple alternative transportation modes may be evaluated and provided in the manner described above.

Figure 4:
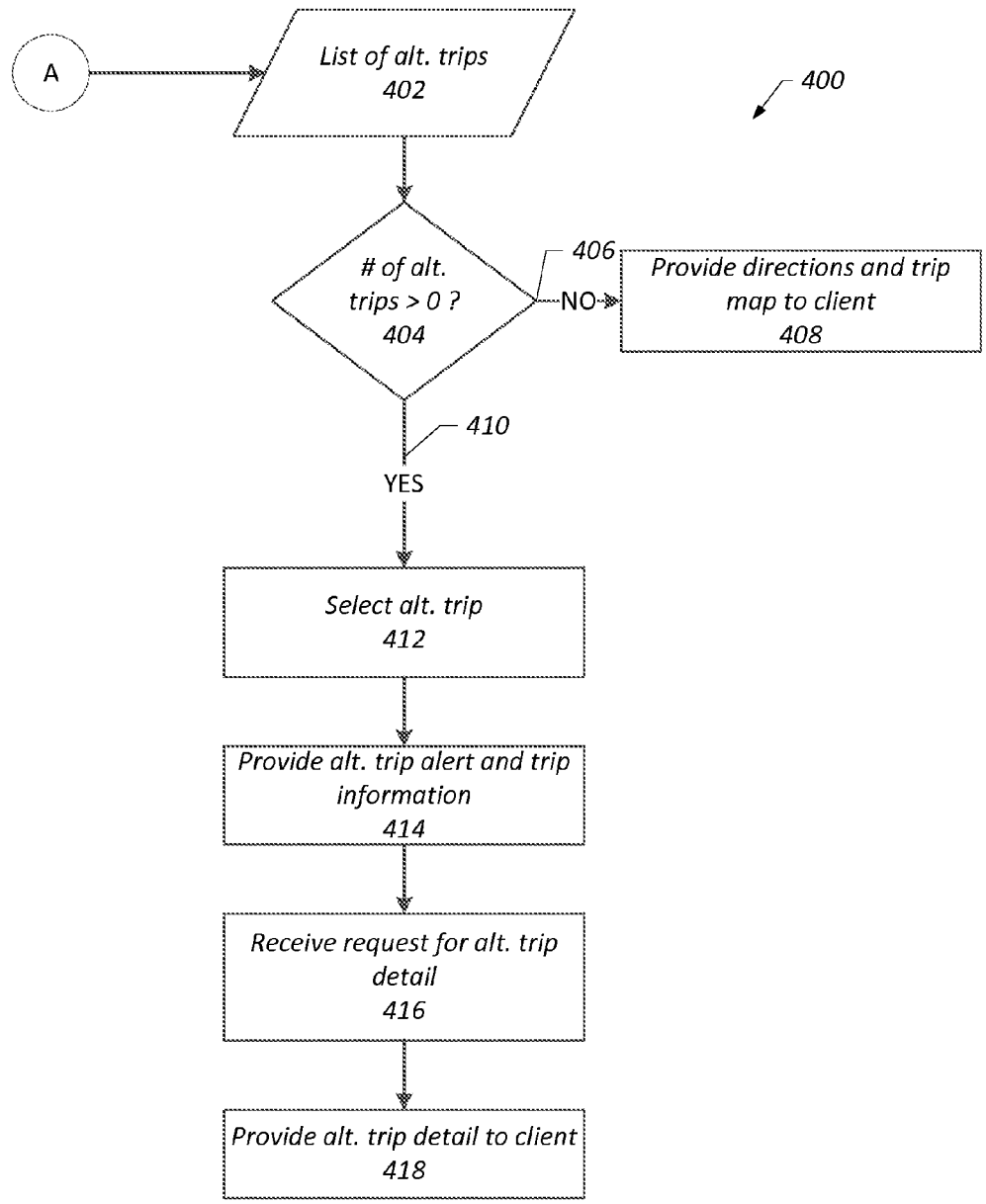
FIG. 4 is a block diagram of a second portion of a process for providing an alternative trip in accordance with an embodiment of the present invention in accordance with an embodiment of the present invention.

FIG. 4 depicts a second portion 400 of a process for providing an alternative trip in accordance with an embodiment of the present invention. For example, the process portion 400 may be implemented by the alternative trip process 212 described above in FIG. 2. The second portion 400 continues from the first portion 300 described above and as illustrated by connector block A. Some or all steps of the process 400 may be implemented as executable computer code stored on a non-transitory tangible computer-readable storage medium and executed by one or more processors of a special-purpose machine, e.g., a computer programmed to execute the code. As described above, a list of alternative trips (block 402) with a lower price than the primary trip may be generated. The list of alternative trips may be evaluated to determine if the number of alternative trips is greater than zero (decision block 404). If the number of alternative trips is not greater than zero (line 406), i.e., there are no alternative trips having a trip price lower than the primary trip, the directions and other primary trip details are provided to the client (block 408).

If the number of alternative trips is greater than zero (line 410), one or more alternative trips may be selected (block 412). For example, in some embodiments, the alternative trips in the list 402 may be ranked by price and the lowest price alternative trip may be selected. In other embodiments, the alternative trips in the list 402 may be ranked by price and the two lowest priced, three lowest priced, four lowest priced trips, or other multiple lowest priced trips may be selected. Next, an alternative trip notification and information may be provided (block 414). For example, a notification may be provided as a visible box or other element in an application, such as the notification in an interactive map as described above and depicted in FIG. 1. In some embodiments, the information may include a link to the selected one or more alternatives trips, descriptive text for the selected alternative trips, or a combination thereof. In some embodiments, the information may include specific details about the selected alternative trips, such as price, trip time, itinerary, and so forth.

Next, if a user decides to retrieve further details about an alternative trip presented in a notification, a request for alternative trips details may be received (block 416). In response, details about selected alternative trips may be provided (block 418). For example, a webpage associated with an alternative trip may be provided to the client via a network. For example, if an alternative trip provided in a notification is a flight and a user selects a link for further details, a webpage for the flight alternative trip may be provided to the client that includes the price and itinerary for the flight. The webpage may provide for a user to complete a transaction associated with the alternative trip, such as by buying tickets for the flight.

Figure 5:
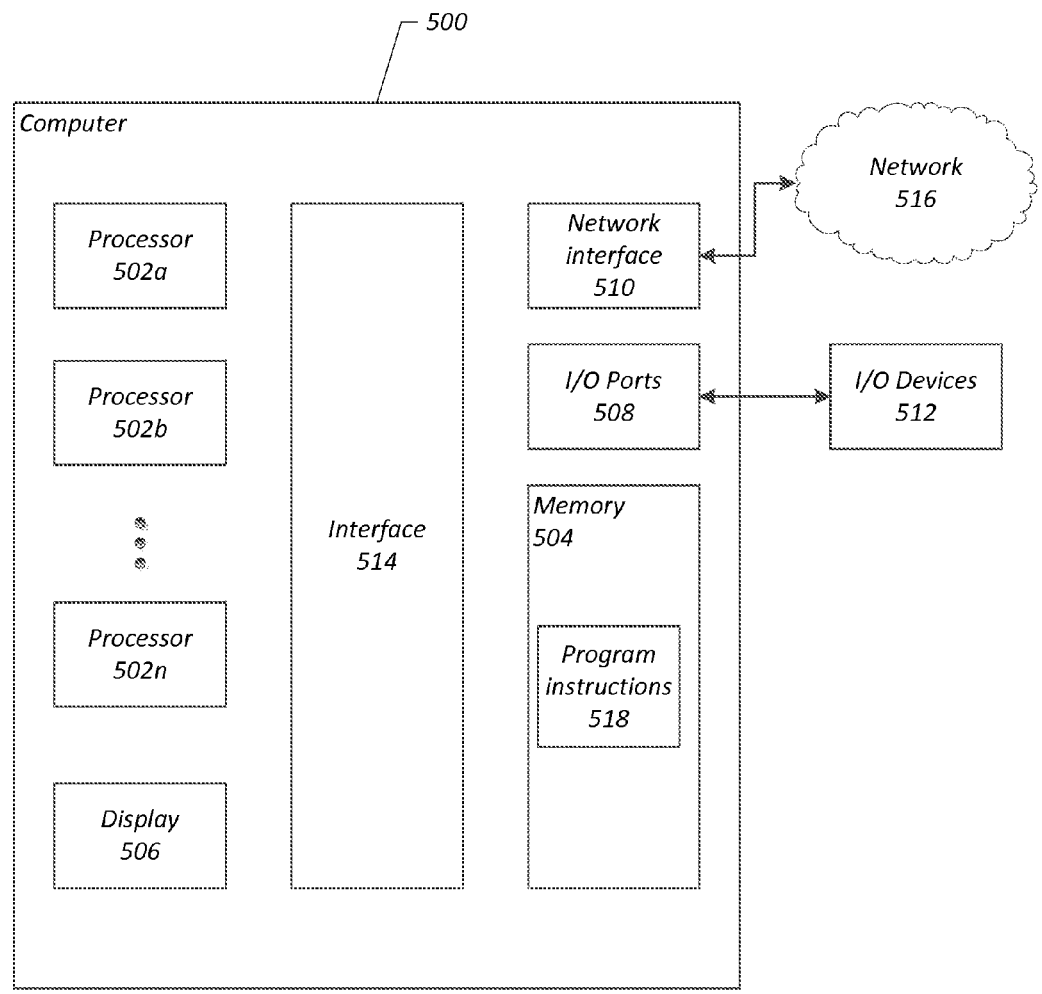
FIG. 5 is a block diagram of a computer in accordance with an embodiment of the present invention.

FIG. 5 depicts a computer 500 (e.g., a client computer, a server, etc.) in accordance with an embodiment of the present invention. Various portions or sections of systems and methods described herein include or are executed on one or more computers similar to computer 500 and programmed as special-purpose machines executing some or all steps of methods described above as executable computer code. Further, processes and modules described herein may be executed by one or more processing systems similar to that of computer 500.

The computer 500 may include various internal and external components that contribute to the function of the device and which may allow the computer 500 to function in accordance with the techniques discussed herein. As will be appreciated, various components of computer 500 may be provided as internal or integral components of the computer 500 or may be provided as external or connectable components. It should further be noted that FIG. 5 depicts merely one example of a particular implementation and is intended to illustrate the types of components and functionalities that may be present in computer 500. As shown in FIG. 5, the computer 500 may include one or more processors (e.g., processors 502a-502n) coupled to a memory 504, a display 506, I/O ports 508 and a network interface 510, via an interface 514.

Computer 500 may include any combination of devices or software that may perform or otherwise provide for the performance of the techniques described herein. For example, computer 500 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 500 may be a unified device providing any one of or a combination of the functionality of a media player, a cellular phone, a personal data organizer, a game console, and so forth. Computer 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 500 may allow a user to connect to and communicate through a network 516 (e.g., the Internet, a local area network, a wide area network, etc.) and to acquire data from a satellite-based positioning system (e.g., GPS). For example, the computer 500 may allow a user to communicate using e-mail, text messaging, instant messaging, or using other forms of electronic communication, and may allow a user to obtain the location of the device from the satellite-based positioning system, such as the location on an interactive map.

In one embodiment, the display 506 may include a liquid crystal display (LCD) or an organic light emitting diode (OLED) display, although other display technologies may be used in other embodiments. The display 506 may display a user interface (e.g., a graphical user interface). In accordance with some embodiments, the display 506 may include or be provided in conjunction with touch sensitive elements through which a user may interact with the user interface. Such a touch-sensitive display may be referred to as a "touch screen" and may also be known as or called a touch-sensitive display system.

The processor 502 may provide the processing capability required to execute the operating system, programs, user interface, and any functions of the computer 500. The processor 502 may receive instructions and data from a memory (e.g., system memory 504). The processor 502 may include one or more processors, such as "general-purpose" microprocessors, and special purpose microprocessors, such as ASICs. For example, the processor 502 may include one or more reduced instruction set (RISC) processors, such as those implementing the Advanced RISC Machine (ARM) instruction set. Additionally, the processor 502 may include single-core processors and multicore processors and may include graphics processors, video processors, and related chip sets. Accordingly, computer 500 may be a uni-processor system including one processor (e.g., processor 502a), or a multi-processor system including any number of suitable processors (e.g., 502a-502n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 504 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 504 may be accessible by the processor 502 and other components of the computer 500. The memory 504 may store a variety of information and may be used for a variety of purposes. The memory 504 may store executable computer code, such as the firmware for the computer 500, an operating system for the computer 500, and any other programs or other executable code necessary for the computer 500 to function. The executable computer code may include program instructions 518 executable by a processor (e.g., one or more of processors 502a-502n) to implement one or more embodiments of the present invention. Instructions 518 may include modules of computer program instructions for implementing one or more techniques described herein with regard to various processing modules. Program instructions 518 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 504 may be used for buffering or caching during operation of the computer 500. The memory 504 may also store data files such as media (e.g., music and video files), software (e.g., for implementing functions on computer 500), preference information (e.g., media playback preferences), wireless connection information (e.g., information that may enable media device to establish a wireless connection), telephone information (e.g., telephone numbers), and any other suitable data.

As mentioned above, the memory 504 may include volatile memory, such as random access memory (RAM). The memory 504 may also include non-volatile memory, such as ROM, flash memory, a hard drive, any other suitable optical, magnetic, or solid-state storage medium, or a combination thereof. The interface 514 may include multiple interfaces and may couple various components of the computer 500 to the processor 502 and memory 504. In some embodiments, the interface 514, the processor 502, memory 504, and one or more other components of the computer 500 may be implemented on a single chip, such as a system-on-a-chip (SOC). In other embodiments, these components, their functionalities, or both may be implemented on separate chips. The interface 514 may be configured to coordinate I/O traffic between processors 502a-502n, system memory 504, network interface 510, I/O devices 512, other peripheral devices, or a combination thereof. The interface 514 may perform protocol, timing or other data transformations to convert data signals from one component (e.g., system memory 504) into a format suitable for use by another component (e.g., processors 502a-502n). The interface 514 may include support for devices attached through various types of peripheral buses, such as a variant of the Peripheral Component Interconnect (PCI) bus standard or the Universal Serial Bus (USB) standard.

The computer 500 may also include an input and output port 508 to allow connection of additional devices, such as I/O devices 512. Embodiments of the present invention may include any number of input and output ports 508, including headphone and headset jacks, universal serial bus (USB) ports, Firewire or IEEE-1394 ports, and AC and DC power connectors. Further, the computer 500 may use the input and output ports to connect to and send or receive data with any other device, such as other portable computers, personal computers, printers, etc.

The computer 500 depicted in FIG. 5 also includes a network interface 510, such as a wired network interface card (NIC), wireless (e.g., radio frequency) receivers, etc. For example, the network interface 510 may receive and send electromagnetic signals and communicate with communications networks and other communications devices via the electromagnetic signals. The network interface 510 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 510 may communicate with networks (e.g., network 516), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 500 may be transmitted to computer 500 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for providing alternative trips for a computer-implemented trip search, the computer-implemented method comprising:

receiving, by one or more processors, a trip request from a client computer, the trip request comprising a request for directions from an origin to a destination via a primary transportation mode;

determining, by one or more processors, in response to the trip request directions between the origin and the destination;

determining, by one or more processors, a primary trip price associated with the trip request based at least in part on the directions between the origin and destination;

determining, by one or more processors, an alternative transportation mode between the origin and the destination, the alternative transportation mode different than the primary transportation mode;

determining for the alternative transportation mode, by one or more processors, an alternative trip price;

providing over a network, by one or more processors, to the client computer the directions between the origin and the destination; and providing over a network, by one or more processors, to the client computer an alternative trip notification having information associated with the alternative transportation mode if the alternative trip price is less than the primary trip price.

2. The computer-implemented method of claim 1, wherein primary transportation mode comprises at least one of: driving, flying, taking a train or public transportation.

3. The computer-implemented method of claim 1, wherein the alternative transportation mode comprises at least one of: driving, flying, taking a train or public transportation.

4. The computer-implemented method of claim 1, wherein the information comprises at least one of; descriptive text for the alternative trip, a link to details for the alternative trip, or the alternative trip price.

5. The computer-implemented method of claim 2, wherein the primary transportation mode is driving and determining, by one or more processors, a primary trip price associated with the request comprises determining a cost of fuel consumption for a vehicle associated with the user.

6. The computer-implemented method of claim 2, wherein the primary transportation mode is driving and determining, by one or more processors, a primary trip price associated with the request comprises: determining the duration of the primary trip is greater than a predetermined duration; and determining a cost of lodging for the primary trip.

7. The computer-implemented method of claim 1, wherein determining for the alternative transportations mode, by one or more processors, the alternative trip price comprises obtaining the alternative trip price from a pricing engine associated with the alternative transportation mode.

8. The computer-implemented method of claim 1, wherein the request from the client computer is received from an interactive map provided on the client computer.

9. The computer-implemented method of claim 8, wherein the alternative trip notification is provided as a visible notification box in the interactive map.

10. A non-transitory tangible computer-readable storage medium having executable computer code stored thereon for providing alternative trips for a computer-implemented trip search, the code comprising a set of instructions that causes one or more processors to perform the following:

receiving, by one or more processors, a trip request from a client computer, the trip request comprising a request for directions from an origin to a destination via a primary transportation mode, determining, by one or more processors, in response to the trip request directions between the origin and the destination;

determining, by one or more processors, a primary trip price associated with the trip request based at least in part on the directions between the origin and destination;

determining, by one or more processors, an alternative transportation mode between the origin and the destination, the alternative transportation mode different than the primary transportation mode;

determining for the alternative transportation mode, by one or more processors, an alternative trip price;

providing over a network, by one or more processors, to the client computer directions between the origin and the destination; and providing over a network, by one or more processors, to the client computer an alternative trip notification having information associated with the alternative transportation mode if the alternative trip price is less than the primary trip price.

11. The non-transitory tangible computer-readable storage medium of claim 10, wherein primary transportation mode comprises at least one of: driving, flying, taking a train, or public transportation.

12. The non-transitory tangible computer-readable storage medium of claim 10, wherein the alternative transportation mode comprises at least one of: driving, flying, taking a train, or public transportation.

13. The non-transitory tangible computer-readable storage medium of claim 10, wherein the information comprises at least one of: descriptive text for the alternative trip, a link to details for the alternative trip, or the alternative trip price.

14. The non-transitory tangible computer-readable storage medium of claim 10, wherein determining for the alternative transportations mode, by one or more processors, the alternative trip price comprises obtaining the alternative trip price from a pricing engine associated with the alternative transportation mode.

15. A system for providing alternative trips for a computer-implemented trip search, comprising:

one or more processors; and a tangible non-transitory memory accessible by the one or more processors, the memory having computer code stored thereon, the code comprising a set of instructions that causes one or more processors to perform the following:

receiving, by one or more processors, a trip request from a client computer, the trip request comprising a request for directions from an origin to a destination via a primary transportation mode, determining, by one or more processors, in response to the trip request directions between the origin and the destination;

determining, by one or more processors, a primary trip price associated with the trip request based at least in part on the directions between the origin and destination;

determining, by one or more processors, an alternative transportation mode between the origin and the destination, the alternative transportation mode different than the primary transportation mode;

determining for the alternative transportation mode, by one or more processors, an alternative trip price;

providing over a network, by one or more processors, to the client computer directions between the origin and the destination; and providing over a network, by one or more processors, to the client computer an alternative trip notification having information associated with the alternative transportation mode if the alternative trip price is less than the primary trip price.

16. The system of claim 15, wherein primary transportation mode comprises at least one of: driving, flying, taking a train, or public transportation.

17. The system of claim 15, wherein the alternative transportation mode comprises at least one of: driving, flying, taking a train, or public transportation.

18. The system of claim 15, wherein the information comprises at least one of: descriptive text for the alternative trip, a link to details for the alternative trip, or the alternative trip price.

19. The system of claim 15, wherein determining for the alternative transportations mode, by one or more processors, the alternative trip price comprises obtaining the alternative trip price from a pricing engine associated with the alternative transportation mode.

20. The system of claim 15, wherein the request from the client computer is received from an interactive map provided on the client computer.

* * * * *